United States Patent
Dillard et al.

(10) Patent No.: US 10,598,527 B2
(45) Date of Patent: Mar. 24, 2020

(54) DIFFERENTIAL FLOW MEASUREMENT WITH CORIOLIS FLOWMETER

(71) Applicant: Weatherford Technology Holdings, LLC, Houston, TX (US)

(72) Inventors: Walter S. Dillard, Houston, TX (US); Sang (Paul) Park, Houston, TX (US); David J. Vieraitis, Spring, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 144 days.

(21) Appl. No.: 15/882,900

(22) Filed: Jan. 29, 2018

(65) Prior Publication Data

US 2019/0234776 A1 Aug. 1, 2019

(51) Int. Cl.
| | | |
|---|---|---|
| *G01F 1/44* | (2006.01) | |
| *G01F 1/40* | (2006.01) | |
| *E21B 47/10* | (2012.01) | |
| *G01F 1/34* | (2006.01) | |
| *G01F 1/80* | (2006.01) | |
| *G01F 5/00* | (2006.01) | |
| *G01F 1/84* | (2006.01) | |
| *G01F 1/74* | (2006.01) | |

(52) U.S. Cl.
CPC ............ *G01F 1/44* (2013.01); *E21B 47/10* (2013.01); *G01F 1/34* (2013.01); *G01F 1/40* (2013.01); *G01F 1/80* (2013.01); *G01F 1/8427* (2013.01); *G01F 1/8436* (2013.01); *G01F 5/00* (2013.01); *G01F 1/74* (2013.01)

(58) Field of Classification Search
CPC ...................................... G01F 1/44; G01F 1/40
See application file for complete search history.

(56) References Cited

U.S. PATENT DOCUMENTS

| | | | | |
|---|---|---|---|---|
| 3,314,290 A | * | 4/1967 | Peranio | G01F 5/00 73/202 |
| 4,638,672 A | * | 1/1987 | McCall | B01F 5/0451 73/861.52 |
| 5,297,426 A | * | 3/1994 | Kane | G01F 5/00 73/202 |
| 5,347,874 A | * | 9/1994 | Kalotay | G01F 1/8422 73/202 |

(Continued)

FOREIGN PATENT DOCUMENTS

WO 2014004166 A1 1/2014

OTHER PUBLICATIONS

Int'l partial ISRWO issued in copending PCT Application No. PCT/US2018/062438 dated Mar. 7, 2019, 15 pages.

*Primary Examiner* — Jewel V Dowtin
(74) *Attorney, Agent, or Firm* — Blank Rome, LLP

(57) ABSTRACT

In a drilling system for drilling a borehole with drilling fluid, a flow loop communicates the drilling fluid, and a differential pressure device in the flow loop at a measurement location produces a pressure drop in flow. The measurement location can be between the borehole and a drilling choke or between a mud pump and the borehole. Piping diverts a portion of the flow at the measurement location so a flowmeter can measure the diverted flow portion. A processing unit receives a measured parameter from the flowmeter and determines a diverted flow rate of the diverted portion therefrom to correlate it to a value of the main flow rate through the flow loop at the measurement location.

25 Claims, 7 Drawing Sheets

(56) References Cited

U.S. PATENT DOCUMENTS

| | | | |
|---|---|---|---|
| 5,445,035 A * | 8/1995 | Delajoud | G01F 1/36 |
| | | | 138/40 |
| 5,661,232 A | 8/1997 | Van Cleve et al. | |
| 5,861,546 A * | 1/1999 | Sagi | G01F 1/44 |
| | | | 137/599.13 |
| 5,861,561 A * | 1/1999 | Van Cleve | G01F 1/8404 |
| | | | 73/861.52 |
| 6,324,917 B1 * | 12/2001 | Mack | G01F 1/372 |
| | | | 73/861.52 |
| 6,561,043 B1 * | 5/2003 | Bailey | G01F 1/44 |
| | | | 73/861.52 |
| 7,819,022 B2 * | 10/2010 | Hope | G01F 1/40 |
| | | | 73/861.52 |
| 8,290,721 B2 * | 10/2012 | Wehrs | G01F 25/0007 |
| | | | 702/179 |
| 8,521,450 B2 * | 8/2013 | Oddie | G01F 1/74 |
| | | | 702/47 |
| 8,522,625 B2 * | 9/2013 | Philipps | G01F 1/22 |
| | | | 73/861.47 |
| 8,984,961 B2 * | 3/2015 | Irani | G01F 1/44 |
| | | | 73/861.52 |
| 2006/0053902 A1 * | 3/2006 | Good | G01F 1/40 |
| | | | 73/861.52 |
| 2010/0191481 A1 * | 7/2010 | Steven | G01F 1/3209 |
| | | | 702/47 |
| 2012/0297893 A1 * | 11/2012 | Lawrence | G01F 25/0007 |
| | | | 73/861.52 |
| 2013/0118235 A1 * | 5/2013 | Morgan | G01N 11/14 |
| | | | 73/54.28 |
| 2014/0069209 A1 * | 3/2014 | Ayers | G01F 1/36 |
| | | | 73/861.52 |

* cited by examiner

DIFFERENTIAL FLOW MEASUREMENT WITH CORIOLIS FLOWMETER

BACKGROUND OF THE DISCLOSURE

Flow measurements are often used in a drilling system when drilling a borehole. For example, in a managed pressure drilling (MPD) system, pump stroke counters attached to mud pumps can be used to estimate the high pressure flowrate into the borehole (inflow). Additionally, a flowmeter can be used to make measurements of the flowrate of drilling fluid out of the borehole (outflow) as the drilling fluid returns at high pressure from the wellbore to surface equipment.

To help control pressure in the MPD system, the flow rate measurements for the inflow and outflow are preferably accurate across a full range of flow in the system's operation, from almost no flow to a maximum flow. Using stroke counters to measure inflow can be mechanically problematic because they do not measure the density of the drilling fluid nor take into account inefficiencies of the mud pump. In the system, density of the drilling fluid for the inflow can be measured at atmospheric pressures and conditions, but these measurements cannot be done on a continuous/real time basis beneficial to automated control. Besides, such density measurements may lack accuracy because the properties of the drilling fluid, as a thixotropic fluid with entrained gas, change when the drilling fluid is dynamically flowing and under pressure. In addition to the inability to measure density, the stroke counter can produce false flow rate readings when the pump cylinders are running but no flow is produced due to plugging or extreme downstream pressure.

To measure the outflow of the drilling fluid from the borehole in the MPD system, a Coriolis flowmeter can measure both density and flow rate, but the Coriolis flowmeter has pressure limitations for sizes large enough for drilling applications. For this reason, the Coriolis flowmeter is typically installed after a choke manifold in the MPD system to measure flow out of the borehole (outflow). The drilling returns from the wellbore must therefore flow through the choke(s) of the manifold to lower the flow's pressure before the Coriolis flowmeter can measure the fluid flow and/or mass flow. This is due to the pressure limitations of the Coriolis flowmeter. Also, during the pressure drop through the choke, cavitation and/or gas flashing may occur that can prevent the Coriolis flowmeter from obtaining an accurate flow rate.

Apart from measuring flow rate using pump stroke counters and Coriolis flowmeters, it is known in the art to use an orifice plate, V-cone, or other device to create a pressure differential in a flow path so the pressure differential can be measured with a differential pressure transducer (DPT). This measured difference in pressure can then be correlated to a flow rate through a flowline.

As a brief example, FIG. 1A shows a flowmeter 50 of the prior art having a differential pressure transducer 70 on a flowline 60 that uses an orifice plate 62 to measure flow rate. As shown, the orifice plate 62 reduces the pressure in the flow so that an upstream pressure $P_1$ is greater than a downstream pressure $P_2$. The pressure transducer 70 connects by tubing 72 to an upstream inlet 74 subject to the upstream pressure $P_1$ and connects by the tubing 72 to a downstream outlet 76 subject to the downstream pressure $P_2$.

As another brief example, FIG. 1B shows a flowmeter 50 of the prior art having a differential pressure transducer 70 on a flowline 60 that uses an V-cone 64 to measure flow rate. As shown, the V-cone 64 reduces the pressure in the flow so that an upstream pressure $P_1$ is greater than a downstream pressure $P_2$. The pressure transducer 70 connects by tubing 72 to an upstream inlet 74 subject to the upstream pressure $P_1$ and connects by the tubing 72 to a downstream outlet 76 subject to the downstream pressure $P_2$.

During operation, the transducer 70 in either flowmeter 50 of FIGS. 1A-1B measures the pressure difference given by $\Delta P = P_1 - P_2$. The flow rate of the main flow (MF) through the flowline 60 is proportional to this pressure differential, where Flow Rate $\propto \Delta P$.

For example, mass flow for liquids can be calculated from the measured pressure difference $\Delta P$ using an equation:

$$m = CEA_t\sqrt{2\Delta p \rho}$$

where:
C is a discharge coefficient,
$A_t$ is a throat area (restriction) of the pressure device,
$\Delta p$ is the differential pressure,
$\rho$ is the density of the fluid,
d is a diameter of the throat of the pressure device (For a V-cone meter, d is a diameter of the V-cone at its largest),
D is the pipe diameter, $$E = \frac{1}{\sqrt{1-\beta^4}} \text{ and}$$

$$\beta = \frac{d}{D} \left( \text{For a V-cone meter, } E = \frac{\beta^2}{\sqrt{1-\beta^4}} \, \beta = \sqrt{1-\frac{d^2}{D^2}} \right).$$

If the flowmeter 50 having the pressure transducer 70 in FIGS. 1A-1B is used in a drilling application, such as in a MPD application, the transducer 70 and the tubing 72 can become plugged or blocked by solids, cuttings, or other contaminates that are typically in the drilling fluid. The plugging can alter the readings provided by the flowmeter 50 or can damage the transducer 70. For this reason, such a flowmeter 50 may not be suitable in many drilling systems and applications.

Operators performing managed pressure drilling can benefit from accurate measurements at multiple points of a closed loop drilling system. Current devices are not available that can provide the desired measurements at certain points. Accordingly, the subject matter of the present disclosure is directed to overcoming, or at least reducing the effects of, one or more of the problems set forth above.

SUMMARY OF THE DISCLOSURE

As disclosed herein, an apparatus for measuring a main flow rate of flow through a flowline comprises a differential pressure device, piping, a flowmeter, and a processing unit. The differential pressure device disposed in the flowline produces a pressure drop in the flow from an upstream side of the differential pressure device to a downstream side of the differential pressure device, and the piping diverts a portion of the flow in the flowline from an inlet on the upstream side of the differential pressure device to an outlet on the downstream side of the pressure device. The flowmeter is in fluid communication with the piping and measures a parameter of the diverted portion of the flow. Receiving the measured parameter from the flowmeter, the processing unit determines a diverted flow rate of the diverted portion of the flow from the measured parameter and correlates the determined diverted flow rate to a value of the main flow rate through the flowline.

The differential pressure device can be selected from the group consisting of an orifice plate, a V-cone, an orifice plate with a variable orifice, a venturi tube, a flow nozzle, a Dall tube, a venturi cone, a venturi nozzle, and a choke. For its part, the flowmeter can be selected from the group consisting of a volumetric flowmeter, a mass flowmeter, an inertial flowmeter, and a Coriolis flowmeter. For example, the flowmeter can measure mass flow rate as mass of the fluid traveling past per unit time for the parameter of the diverted portion of the flow.

In one arrangement, the apparatus can further include a control manifold of a drilling system disposed on the flowline downstream of the differential pressure device that receives the flow of drilling fluid returns from the borehole. In another arrangement, the apparatus can further include a pump of a drilling system disposed on the flowline upstream of the differential pressure device to pump the flow of drilling fluid from a mud tank to the borehole.

In one way to determine the diverted flow rate of the diverted flow portion from the measured parameter, the processing unit can be configured to: store, for each of a plurality of fluid types, a relationship of the main flow rate relative to the diverted flow rate; obtain the fluid type of the flow; and correlate the value of the main flow rate from the relationship relative to the diverted flow rate for the obtained fluid type of the flow. The relationship of the main flow rate relative to the diverted flow rate can be a linear relationship, a polynomial relationship, other relationship.

The correlation of the diverted flow rate relative to the main flow rate through the flowline can be a function of a first diameter of the flowline, a second diameter of the piping, a first character of the differential pressure device, and a second character of the fluid of the flow. For example, the first character of the differential pressure device can at least include a beta-ratio of the differential pressure device (e.g., throat diameter/pipe diameter), and the second character of the fluid of the flow can at least include a constancy index and a power-law index of a Herschel-Bulkely model for the fluid in the flow.

In another way to determine the diverted flow rate of the diverted flow portion from the measured parameter, the processing unit can be configured to: obtain a character of the fluid of the flow; determine, based on the obtained character, an intercept in a relationship between the main flow rate and the diverted flow rate at which the diverted flow rate is zero; determine, based on the obtained character, a slope in the relationship between the main flow rate and the diverted flow rate; and correlate the value of the main flow rate relative to the diverted flow rate from the intercept and the slope in the relationship. The character of the fluid of the flow can at least includes a constancy index and a power-law index of a Herschel-Bulkely model for the fluid.

A drilling system for drilling a borehole with drilling fluid comprises a flow loop, a differential pressure device, piping, a flowmeter, and a processing unit. The flow loop communicates the drilling fluid from the borehole to at least one drilling choke, communicates the drilling fluid from at least one tank to at least one pump, and communicates the drilling fluid from the at least one pump to the borehole. The differential pressure device is disposed in the flow loop at a measurement location and produces a pressure drop in flow of the drilling fluid from an upstream side of the differential pressure device to a downstream side of the differential pressure device.

The piping diverts a portion of the flow in the flow loop at the measurement location from an inlet on the upstream side of the pressure device to an outlet on the downstream side of the pressure device. The flowmeter in fluid communication with the piping measures a parameter of the diverted portion of the flow. Receiving the measured parameter from the flowmeter, the processing unit determines a diverted flow rate of the diverted portion of the flow from the measured parameter and correlates the determined diverted flow rate to a value of the main flow rate through the flow loop at the measurement location.

The measurement location can be disposed in the outflow leg of the flow loop between the borehole and the at least one drilling choke. Alternatively, the measurement location can be disposed in the inflow leg (standpipe) of the flow loop between the at least one pump and the borehole.

According to the present disclosure, a method of measuring a main flow rate of flow through a flowline comprises: producing, using a differential pressure device disposed in the flowline, a pressure drop in the flow from an upstream side of the differential pressure device to a downstream side of the differential pressure device; diverting, using piping on the flowline, a portion of the flow in the flowline from an inlet on the upstream side of the differential pressure device to an outlet on the downstream side of the differential pressure device; measuring, using a flowmeter in fluid communication with the piping, a parameter of the diverted portion of the flow; determining, using a processing device receiving the measured parameter, a diverted flow rate of the diverted portion of the flow from the measured parameter; and correlating, using the processing device, the determined diverted flow rate to a value of the main flow rate through the flowline.

The foregoing summary is not intended to summarize each potential embodiment or every aspect of the present disclosure.

DETAILED DESCRIPTION OF THE DISCLOSURE

Figure 1A:
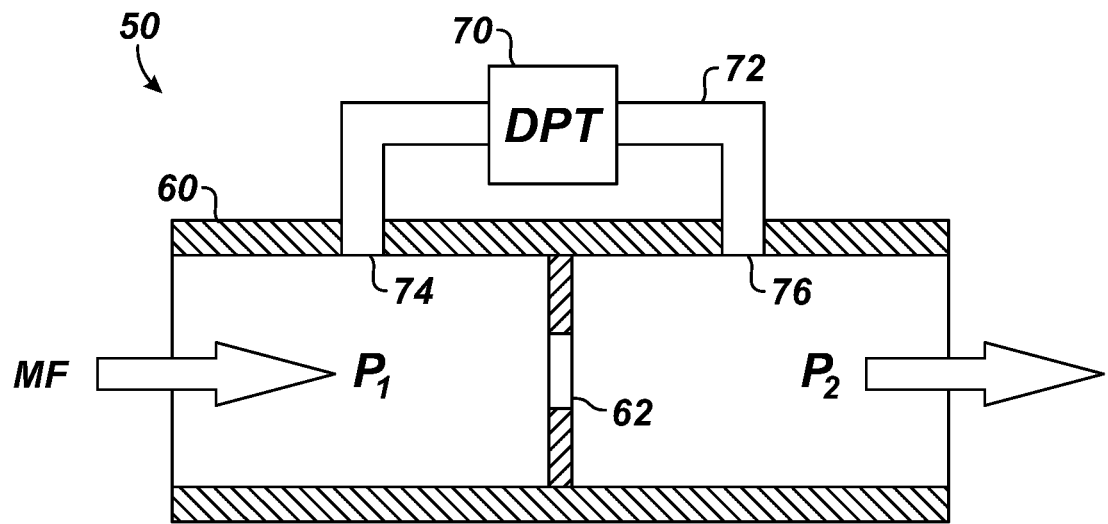
FIG. 1A illustrates a differential pressure transducer disposed on a flowline having an orifice plate for measuring flow rate.
Figure 1B:
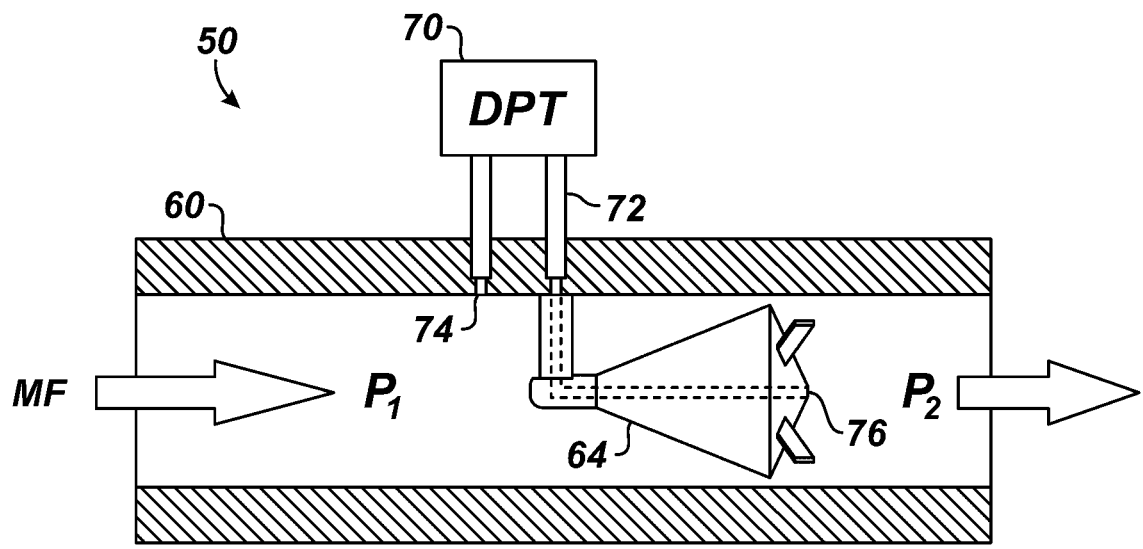
FIG. 1B illustrates a differential pressure transducer disposed on a flowline having a V-cone for measuring flow rate.
Figure 2A:
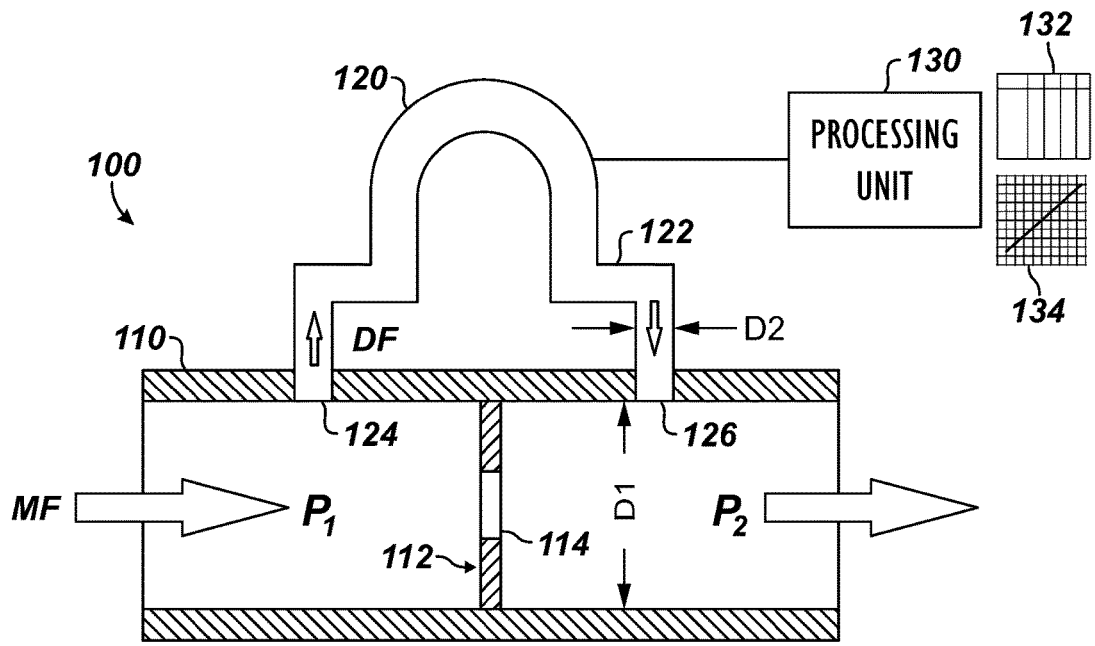
FIG. 2A illustrates an apparatus according to the present disclosure disposed on a flowline having an orifice plate for measuring flow rate.
Figure 2B:
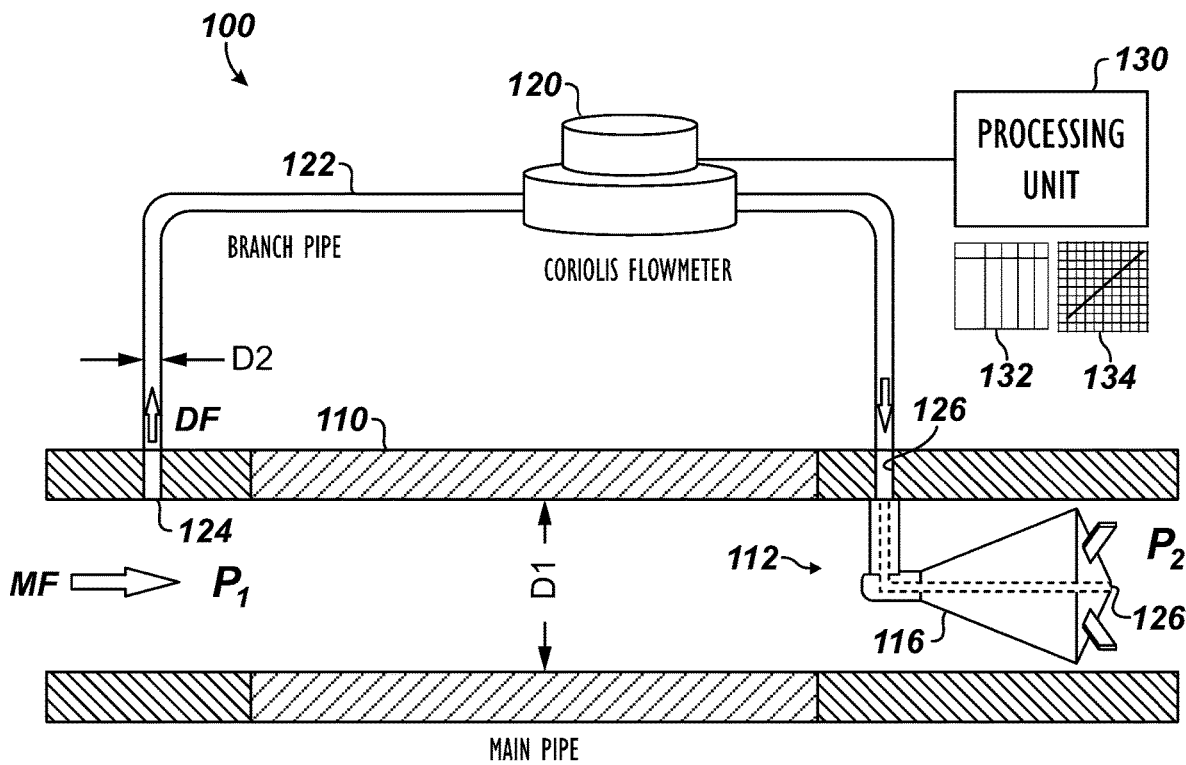
FIG. 2B illustrates an apparatus according to the present disclosure disposed on a flowline having a V-cone for measuring flow rate.

As shown in FIGS. 2A-2B, an apparatus 100 according to the present disclosure includes a main flowline or pipe 110 for delivering drilling fluid flow. In a managed pressure system, such as discussed much later in reference to FIG. 7, the apparatus 100 can be disposed at advantageous locations in the system's closed loop, such as on an outlet flowline from the borehole upstream of a choke manifold, or on an inlet flowline (e.g., standpipe) into the well downstream of mud pumps. Of course, the apparatus 100 can be used in other locations, such as downstream of the choke manifold.

In FIGS. 2A-2B, a differential pressure device 112 is disposed in the main flowline 110 to produce a pressure drop across the flow. The differential pressure device 112 can include an orifice plate 114 as in FIG. 2A, a V-cone 116 as in FIG. 2B, an orifice plate 114 with a variable orifice or throat, a venturi tube, a flow nozzle, a Dall tube, a venturi cone, a venturi nozzle, a choke, or other mechanism to produce a pressure drop ($P_1 > P_2$) in the flow through the main flowline 110.

The apparatus 100 measures a differential flow rate (instead of differential pressure) across the pressure device 112. To do this, a flowmeter 120 is connected by piping or side branch tubing 122 to an inlet or upstream port 124 on the upstream side of the pressure device 112 and to an outlet or downstream port 126 on the device's downstream side. Isolation or control valves (not shown) can be disposed on the branch tubing 122 as desired to bypass the flowmeter 120.

The flowmeter 120 can be a volumetric flowmeter, a mass flowmeter, an inertial flowmeter, or a Coriolis flowmeter. The flow measurement of interest by the flowmeter 120 is preferably a volumetric flow measurement. As will be appreciated, such a volumetric flow measurement can be derived from a mass flow measurement divided by a fluid density measurement—both of which can be obtained with a Coriolis flowmeter 120. For instance, the Coriolis flowmeter 120 can determine a density measurement of the fluid based on the resonant frequency of the tube(s) as the mass of the fluid flows through the known mass and the known volume of the tube(s). Additionally, the density measurements of the Coriolis flowmeter 120 can be correlated with the main flow rate, and density determination may provide a correction factor for main flow rate.

The drilling fluid flow (i.e., main flow MF) passes through the flowline 110, and a percentage or portion of the entire drilling fluid flow is diverted through the branch tubing 122 to the flowmeter 120, as diverted flow DF. Because the flow may be drilling fluid returns from a wellbore, a junk catcher (not shown) or similar device may be used upstream of the apparatus 100 to trap cuttings, debris, etc. that may plug the flow spaces of the apparatus 100.

A processing unit 130 measures the diverted flow rate of this smaller/diverted flow DF with the flowmeter 120 and then correlates the diverted flow rate to the entire main flow rate of the main flow MF based on a relationship defined for the implementation. To do the correlation, the processing unit 130 can have a lookup table 132 of data calibrated to the implementation of the apparatus 100. The processing unit 130 can also have an equation 134, mathematical model, or the like configured to the implementation of the apparatus 100 for calculating the main flow rate.

Using the branch's volumetric flow rate DFR from the flowmeter 120 on the branch tubing 122, the processing unit 130 can thereby determine the main volumetric flow rate MFR of the main flowline 110 based on the defined relationship. Density of the drilling fluid can be measured at the branch tubing 122 using a Coriolis-type flowmeter 120.

As will be appreciated, the processing unit 130 can include one or more programmable processors, memory, input/output interfaces, and other functional components enabling the unit 130 to process received input, access lookup tables 132 or perform calculations of equations 134, and provide suitable output for system control and operation.

The relationship for the implementation is defined at least by the diameter D1 of the flowline 110, the diameter D2 of the branch tubing 122, the character of the differential pressure device 112, and the character of the fluid in the flow through the flowline 110. In particular, the differential pressure device 112 in the primary flow path induces a pressure drop $\Delta P = P_1 - P_2$. This pressure drop $\Delta P$ induces fluid flow in the branch tubing 122 between the upstream and downstream ports 124, 126. Rather than measuring a (static) difference in pressure $\Delta P$ between the upstream and downstream ports 124, 126, however, the flowmeter 120 measures the flow, density, volumetric flow rate, and/or mass flow rate of the diverted flow DF from the main flow MF diverted through the branch tubing 122 from the upstream port 124 to the downstream port 126.

As shown, the orifice plate 114, V-cone 116, or other pressure device 112 reduces the pressure in the flow so that the upstream pressure $P_1$ is greater than the downstream pressure $P_2$. The pressure difference given by $\Delta P = P_1 - P_2$ is dictated by the character of the differential pressure device 112. The pressure differential $\Delta P$ in conjunction with the diameter D1 of the flowline 110 and the diameter D2 of the branch tubing 122 can then dictate in a linear, a polynomial, or other relationship how much of the main flow is diverted through the branch piping 122 for measurement by the flowmeter 120.

For illustrative purposes related to a drilling application, the flowline 110 may have about a 6-in. diameter D1, while the branch tubing 122 may have about a 1-in. diameter D2. The flowline 110 having a 6-in. diameter may be suited for the flowline for a standpipe downstream of mud pumps in a drilling system.

The branch tubing 122 having a diameter D2 of 1-in. may be suited for use with the 6-in. flowline 110. Other diameters D1, D2 for the flowline 110 and the branch tubing 122 could be used. The flowline 110 for drilling applications could also have a diameter D1 of up to 10-in. or other diameters. Moreover, other diameters D2 for the branch piping 122 could be used, such as one suitable for diameter D1 of 10-in. In general, the range of diameters D2 for the branch tubing 122 depends at least in part on the diameter D1 of the flowline 110. Overall, an acceptable diameter D2 for the branch tubing 122 would be that which could provide a turndown ratio of 10:1 based on the characteristics of the implementation.

The differential pressure device 112 can be characterized by a beta ratio between the diameter of the orifice or throat of the device 112 relative to the inner diameter of the flowline 110. In other words, if d is the diameter of the orifice or throat and D1 is the pipe diameter, the beta ratio is given as $$\beta = \frac{d}{D1}$$

for an orifice plate or $$\beta = \sqrt{1 - \left(\frac{d}{D1}\right)^2}$$

for a V-cone. A smaller beta ratio β for the device 112 means the device 112 has a smaller restriction size of the orifice or throat, which equates to a greater pressure drop. For the purposes related to a drilling application, the beta ratio β of the differential pressure device 112 can be similar to any of the handful of sizes conventionally used in the art, which can be between 0.8 to 0.4 or even lower. Other beta ratios β could be used depending on the implementation.

Other parameters for the differential pressure device 112 can be used for its characterization. For example, the parameter for the differential pressure device 112 can include a discharge coefficient C, which is calibrated as a ratio of the actual mass flow rate to the measured mass flowrate across the device 112. The parameters for the differential pressure device 112 can include a turndown ratio, which is the ratio of the maximum to the minimum flowrate that can be accurately measured (i.e., the ratio of highest to lowest readable flow). Ideally, a large turndown ratio is desirable for the device 112 so the apparatus 100 can measure a wide range of flowrates.

Figure 3:
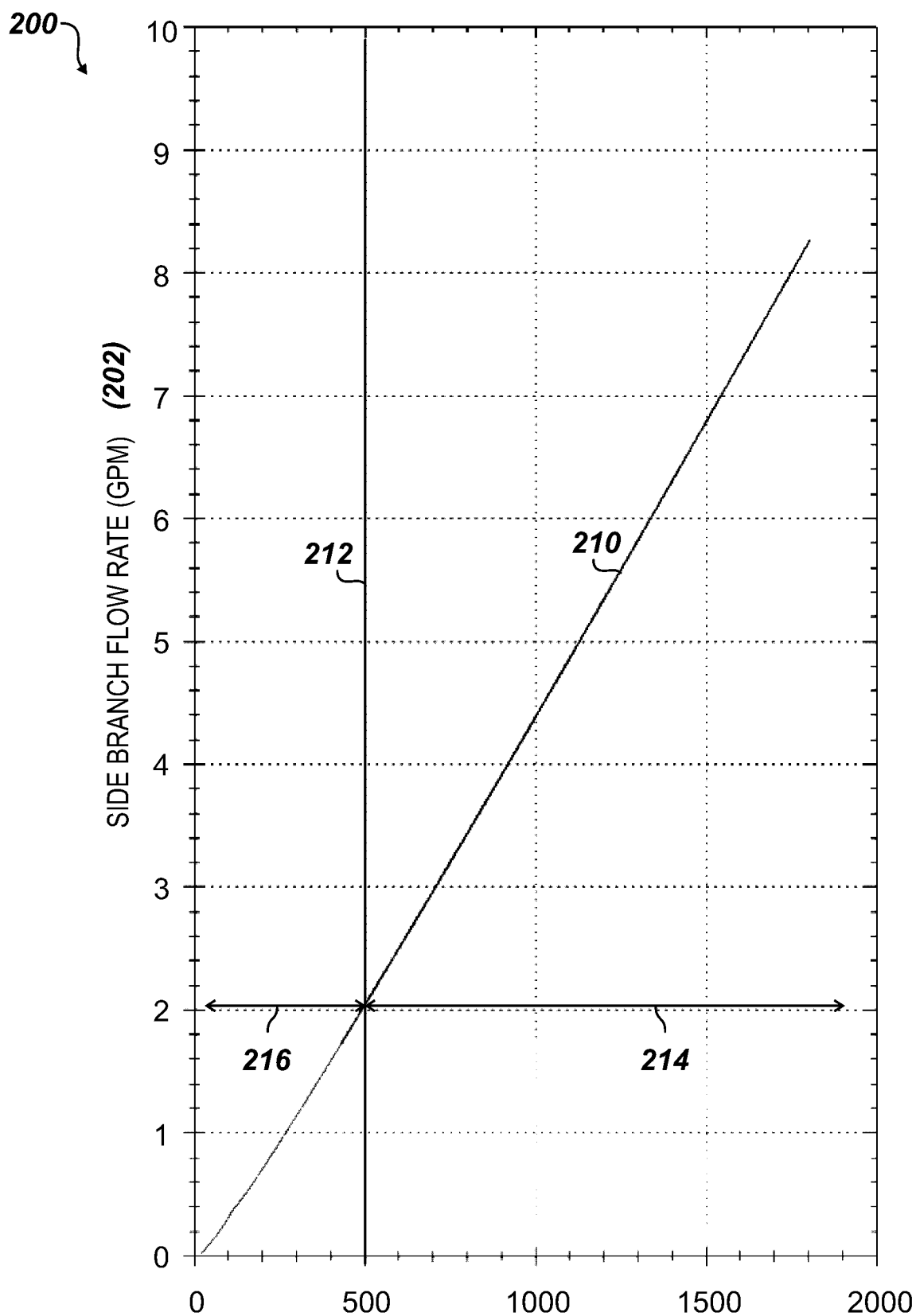
FIG. 3 illustrates a graph of a volumetric flow rate relationship between a main pipe flow rate relative to a side branch's diverted flow rate.

Other than the geometric arrangement of an implementation, the character of the fluid in the flow being measured can dictate the particulars of the defined relationship. As shown in FIG. 3, a graph 200 depicts a relationship 210 between a differential flow rate 202 (i.e., the side branch's diverted flow rate DFR through the branch tubing 122 and measured by the flowmeter 120) and a main flow rate 204 (i.e., the main flow rate MFR through the flowline 110 that is unknown). The relationship 210 can be defined as a curve, equation, or the like.

As depicted in FIG. 3, for example, the relationship 210 may be linear. However, there may be a transition zone 216 at lower flowrates below some threshold 212 in which the relationship 210 may need correction. In other words, a range 214 of main flow rates 204 through the main flowline (110) are preferably larger to a certain degree compared to the diverted flow rate 202 through the side branch tubing (122) so that the correlation or relationship 210 has more accuracy. Yet, a calibration process performed on the apparatus 100 during manufacture and in field can provide correction factors, which would provide the flowmeter (120) with a turn-down ratio of minimum 10:1.

Given an understanding of the apparatus 100 and the underlying correlation of interest, discussion now turns to a process of using the disclosed apparatus 100 for determining the main flow rate in a flowline 110, such as in a drilling system.

Figure 4:
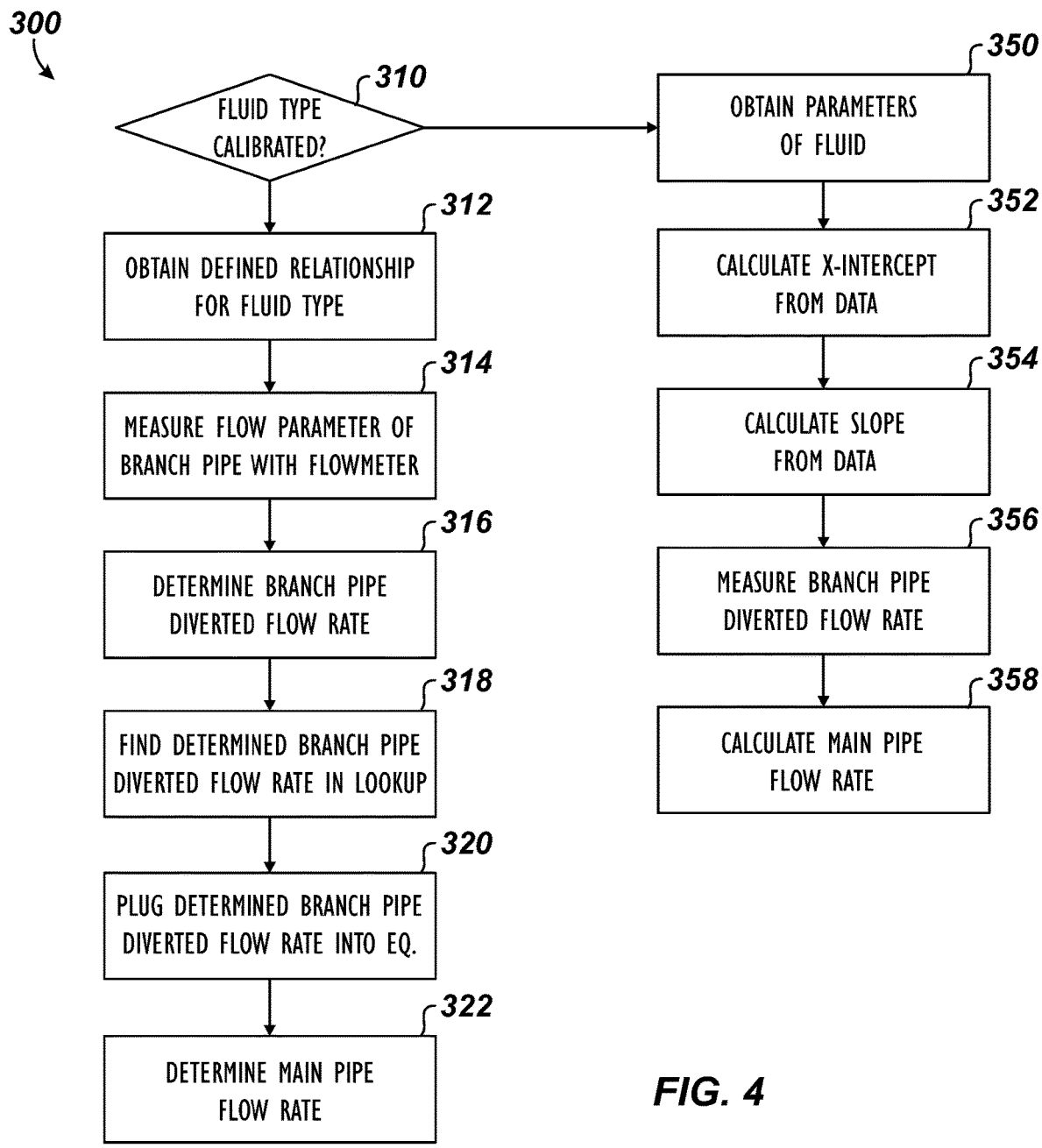
FIG. 4 illustrates a flowchart for determining a flow rate in a flowline using the disclosed apparatus.

FIG. 4 illustrates a process (300) for determining a main flow rate in a flowline 110 using the disclosed apparatus 100, such as in FIGS. 2A-2B. The processing unit 130 can determine whether the apparatus 100 is calibrated for a type of fluid flowing in the flowline 110 (Decision 310). Given that a drilling application may use different types of fluids at different times, the fluid type may be input into the processing unit 130 manually, can be set as a default, or can be provided by automatic selection from other controls of a drilling system.

In some drilling applications, for example, different weights of drilling fluids are used during different drilling phases. Also, the viscosity of drilling fluid changes with flow rate. Advantageously, the disclosed apparatus 100 keeps the flow running, which can avoid an undesired increase in viscosity. In general, the drilling fluid is a thixotropic fluid with properties changing dynamically while flowing under pressure.

To account for the different weights of drilling fluids in real time, the differential pressure device 112 can be adjustable in the apparatus 100 to change the pressure drop ΔP produced in relation to the given mud weight currently used during a given phase of the drilling operation. For example, the orifice plate 114 (FIG. 2A) may have an orifice that can have its diameter adjusted according to a given mud weight so the beta ratio β for the device 112 can be adjusted. In addition or in the alternative to account for different weights of drilling fluid, the processing unit 130 of the apparatus 100 can include stored parameters, graphs, tables, and other information for calibration and correction of the measurements made based on a given weight or type of the drilling fluid being measured.

Accordingly, given a calibrated fluid type in the process (300) of FIG. 4, the processing unit 130 obtains the defined relationship for the fluid type (Block 312). Again, this relationship can be defined in memory as a lookup table 132, equations 134, or the like. Then, during operation of the apparatus 100, the processing unit 130 obtains a measurement of a flow parameter in the branch tubing 122 with the flowmeter 120 (Block 314). For example, the flowmeter 120 as a Coriolis flowmeter can provide flow parameters, such as mass flow rate, density, volumetric flow rate, etc. Depending on what parameters are provided, the processing unit 130 determines the branch's volumetric flow rate DFR in the branch tubing 122 (Block 316).

Depending on the configuration of the processing unit 130, the processing unit 130 can then find the diverted flow rate DFR in a lookup table 132 (Block 318), can plug the diverted flow rate DFR into an equation 134 (Block 320), or can use some other algorithm of the defined relationship. Finally, the processing unit 130 determines the main flow rate MFR from its correlation to the diverted flow rate DFR in the defined relationship (Block 322).

Figure 5:
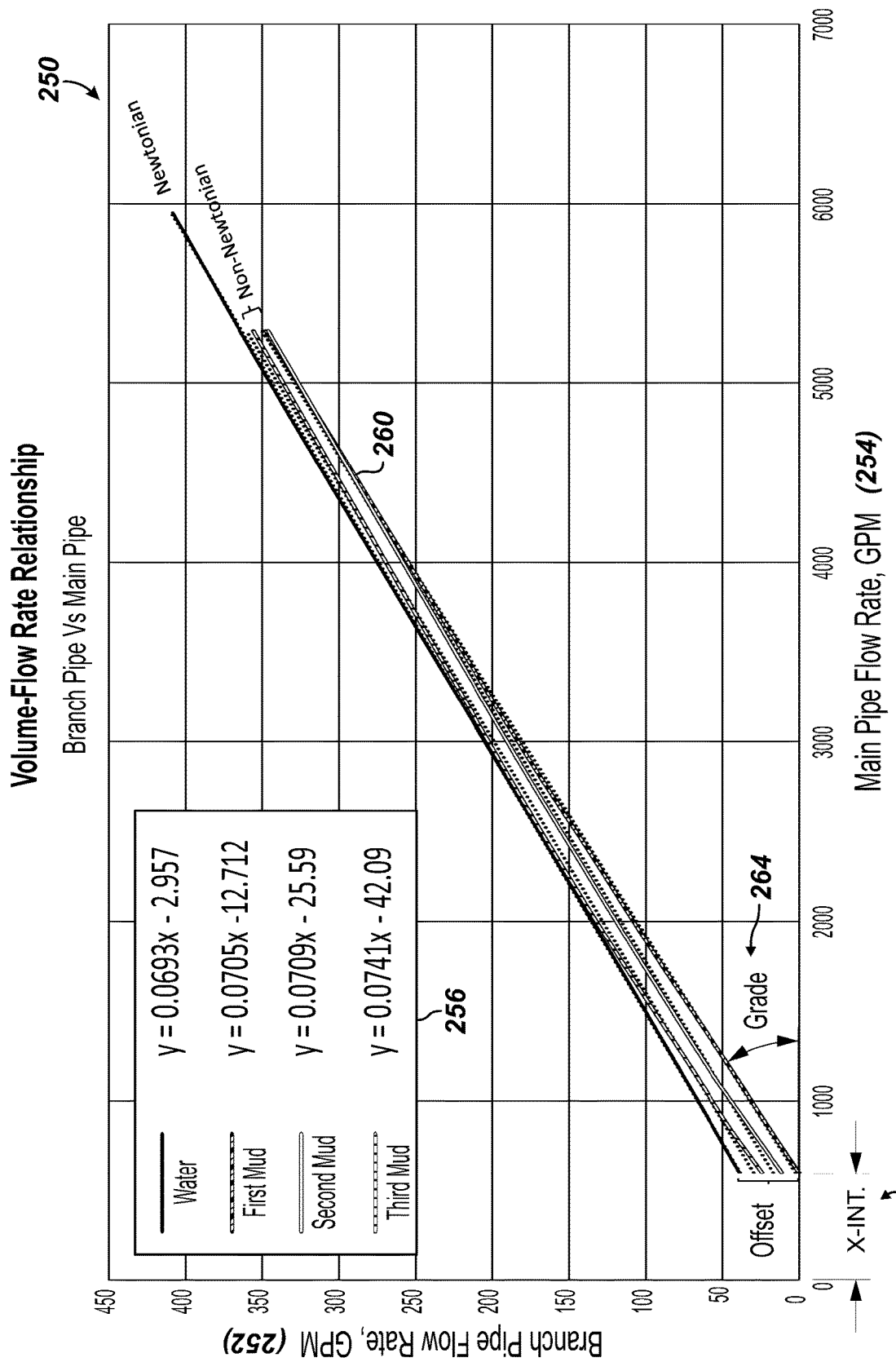
FIG. 5 illustrates another graph of a volumetric flow rate relationship between a main pipe flow rate relative to a side branch's diverted flow rate for both Newtonian and non-Newtonian fluids.

As depicted in graph 250 in the example of FIG. 5, the defined relationship used by the processing unit (130) can be based on a volumetric flow rate relationship 260 between the diverted flow rate 252 relative to the main flow rate 254. The graph 250 plots the relationship 260 between the diverted flow rate 252 relative to the main flow rate 254 for four types of fluid. In general, the types of fluid can refer to different classifications of fluids (water, drilling fluid or mud, fracture fluid, slick water, etc.), fluids for different purposes (different mud weights), Newtonian and non-Newtonian fluids, more or less viscous fluids, etc. As shown in the legend 256, the four types of fluids in this example include water, a first drilling mud, a second drilling mud, and a third drilling mud.

Water is a Newtonian fluid, and its relationship 260 between the diverted flow rate 252 relative to the main flow rate 254 is linear. For example, the equation for water as shown in the legend 256 can be characterized by the linear equation y=0.0693x−2.957.

The drilling muds are non-Newtonian fluids, and their characterization can be more complex than just defining the fluid with a viscosity or some other attribute. For the present characterization, the drilling muds can be characterized by the Herschel-Bulkely model:

$$\eta = \frac{\tau_0}{\dot{\gamma}} + k\dot{\gamma}^{n-1}$$

where $\eta$=dynamic shear viscosity, $\tau_0$=yield stress, $\dot{\gamma}$=strain rate, k=consistency index (SI units Pa*s$^n$), and n=power-law exponent or flow index.

Using this characterization, the drilling muds as non-Newtonian fluids can each be characterized by $2^{nd}$ order polynomial equations (y=Diverted Flow Rate 252, x=Main Flow Rate 254). The apparatus 100 operating as a mass flowmeter will exhibit these $2^{nd}$ order polynomial relationships 260 between the diverted flow rate 252 and the main rate 254 over about 90% of the full range at least when flowing drilling mud.

In FIG. 5, the relationships 260 for the three generic types of drilling muds used during drilling operations are graphed as $2^{nd}$ order polynomials. The first drilling mud can be characterized by a consistency index k of 0.01637 and a power-law index n of 0.898. The second drilling mud, which is intermediate in nature between the first and third muds, can be characterized by a consistency index k of 0.312 and a power-law index n of 0.598. The third drilling mud can be characterized by a consistency index k of 0.734 and a power-law index n of 0.513. As will be appreciated, more or less drilling muds can be characterized in this manner and can be represented by any suitable values or ranges of values for the consistency index k and the power-law index n.

Because the $2^{nd}$ order term in each equation is far smaller in order of magnitude than the other terms, the three equations for the drilling muds can essentially be reduced to linear equations, as expressed in the legend 256 for the range of interest. For example, with y representing the diverted flow rate and x representing the main flow rate, the $2^{nd}$ order polynomial equation for the first drilling mud y=−2E−06x$^2$+0.0804x−22.539 can be characterized by the linear equation y=0.0705x−12.712, which may have a difference in accuracy of only about 0.1% in a full range of measurements, such as in the range of 0 to 5300 GPM in the present example. Additionally, due to the characteristics of the non-Newtonian fluids (pseudo-plastic with n<1) such as the drilling muds, the linear relationship 260 will have offsets from a Newtonian relationship.

As shown in the legend 256 with y representing the diverted flow rate and x representing the main flow rate, the relationships 260 for the fluids can be characterized linearly as: y=0.0693x−2.957 for water; y=0.0705x−12.712 for the first mud; y=0.0709x−25.59 for the second mud; and y=0.0741x−42.09 for the third mud. Accordingly, each of these fluid types can be characterized by an x-intercept 262 (the lowest main flow rate resulting in a diverted flow rate of 0-GPM) and by a grade or slope 264.

The particular variables of the $2^{nd}$ order polynomials and by extension of the slope 262 and x-intercept 264 in the linear relationships 260 for each of these fluids are governed by the geometry of the apparatus (100). Here, the variables fit the arrangement in which the main pipe diameter (D1) is 6-in., the branch pipe diameter (D2) is 1-in., and the beta ratio β of the differential pressure device (112) is 0.5. Other arrangements would result in different variables to the equations. The particular variables for the equations of different fluids in a different arrangement of the apparatus (100) can be derived using the teachings of the present disclosure and the principles, algorithms, and the like associated with fluid dynamic analysis.

Again, the details of the relationships 260 for these and other fluids can be stored in the processing unit (130) in a tabular form (132), equations (134), or other characterization configured to the particular geometrical arrangement of the apparatus (100). Given a measured diverted flow rate 252 and a known type of fluid in the flowline (110), the processing unit (130) can then determine the correlated main flow rate 254. As one example, a diverted flow rate 252 of 200-GPM would equate to a main flow rate 254 of 3000-GPM for the third drilling mud.

In a given implementation of the apparatus 100, characterization of one or more drilling fluids may not already be configured in the processing unit 130. For such instances where the apparatus 100 is used in a drilling system with a non-calibrated drilling fluid, back calculations can be used to determine the main flow rate of the flowline 110 given a measured diverted flow rate based on input information of the fluid in use.

Figure 6A:
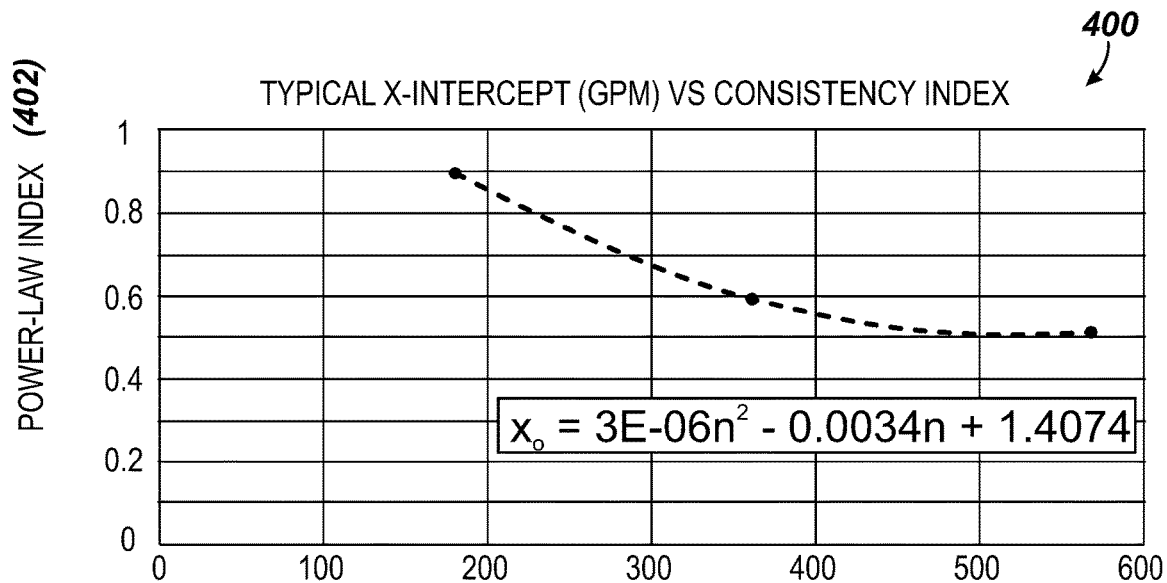
FIG. 6A illustrates a graph of a typical x-intercept relative to a power-law index for a flow rate relationship for non-Newtonian fluid.

In particular, FIG. 6A illustrates a graph 400 of a typical x-intercept 404 of the main flow rate relative to a power-law index 402 for a subject drilling fluid. Knowing the power-law index 402 of the subject drilling fluid, the x-intercept 404 for the linear relationship between the diverted flow rate and the main flow rate can be determined. The x-intercept 404 ($x_o$) (i.e., the value of the main flow rate x in the fluid's equation at which the diverted flow rate y is 0) equates to values of the power-law index (n) based on the equation: $x_o$=(3E−06)n$^2$−0.0034n−1.4074. Again, the variables of the equation are governed by the geometrical arrangement of the configuration (namely, the 6-in. main flow diameter in combination with the 1-in. branch flow diameter and the beta ratio β for the pressure device). A different configuration would have an equation with different variables suited to the geometrical arrangement.

Figure 6B:
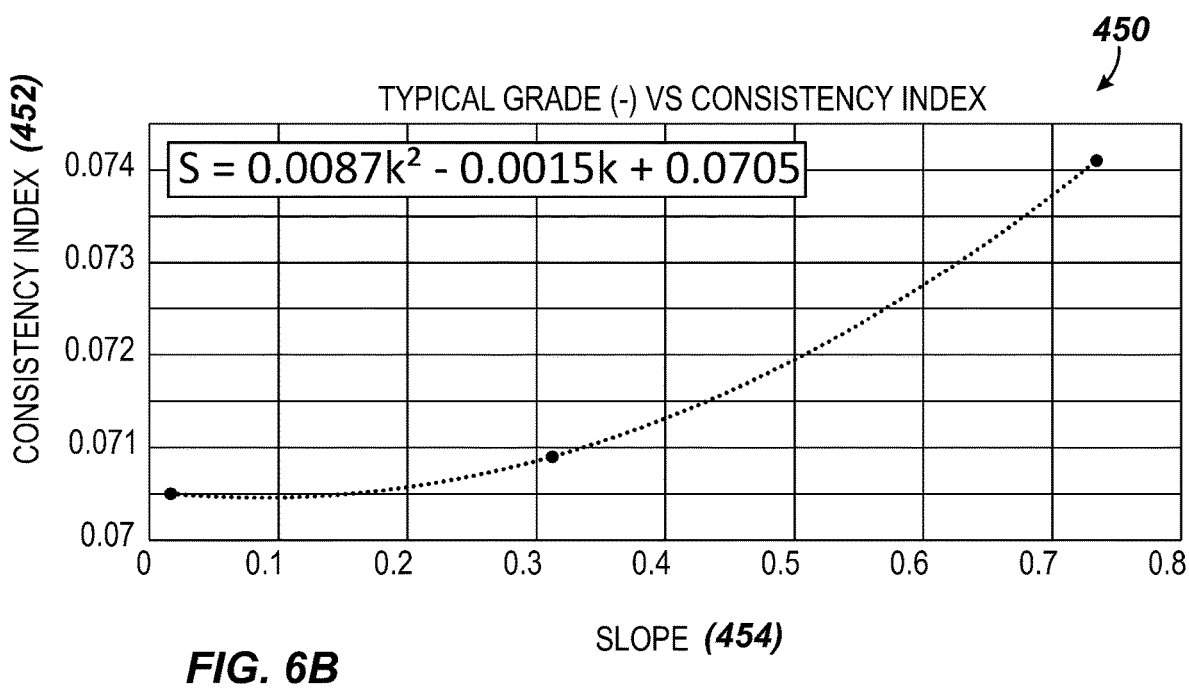
FIG. 6B illustrates a graph of a typical slope relative to a consistency index for a flow rate relationship for non-Newtonian fluid.

In a similar fashion, FIG. 6B illustrates a graph 450 of a typical grade or slope 454 of the flow rate relative to the consistency index 452 of the subject drilling fluid. Knowing the consistency index 452 of the subject drilling fluid, the slope 454 for the linear relationship between the diverted flow rate and the main flow rate can be determined. The slope (S) equates to values of the consistency index (k) based on the equation: S=0.0087 k$^2$−0.0015 k+0.0705. Again, the variables of the equation are governed by the geometrical arrangement of the configuration (namely, the 6-in. main flow diameter in combination with the 1-in. branch flow diameter and the beta ratio β for the pressure device). A different configuration would have an equation with different variables suited to the geometrical arrangement.

The details of these equations can be stored in the processing unit (130) in a tabular form (132), equations (134), or other characterization configured to the particular geometrical arrangement of the apparatus (100). Given the known character of the fluid in the flowline (110) in terms of its power-law index 402 and consistency index 452, the processing unit (130) can then determine the x-intercept 404 and slope 454 of the linear relationship correlating the diverted flow rate relative to the main pipe flow rate for the fluid. Then, given the measured diverted flow rate obtained with the flowmeter (120), the processing unit (130) can determine the main pipe flow rate.

Details of this are shown in the process (300) of FIG. 4. In particular, the drilling operation may use a fluid type that has not been calibrated (No-Decision 310), the processing unit 130 therefore obtains parameters of the subject drilling fluid (Block 350). These parameters include the power-law index and the consistency index of the subject fluid and can be obtained from manual input, memory, or other source.

Using a lookup table 132, equation 134, or other model, the processing unit 130 determines or calculate the x-intercept for the subject fluid based on the obtained power-law index (Block 352). As shown in FIG. 6A, for example, for a fluid having a power-law index 402 of about 0.55, the x-intercept 404 for the governing relationship between diverted flow rate and main flow rate would be about 400 (GPM) for the present configuration.

Using the lookup table 132, equation 134, or other model, the processing unit 130 then determines or calculates a slope for the subject fluid based on the obtained consistency index (Block 354). As shown in FIG. 6B, for example, for a fluid having a consistency index 452 of about 0.072, the slope 454 for the governing relationship between diverted flow rate and main flow rate would be about 0.5 for the present configuration. Given the x-intercept ($x_o$) and the slope (S), the governing relationship between diverted flow rate (x) and main flow rate (y) can be estimated as the linear equation: $y=Sx+x_o$.

At this point, the process (300) involves measuring the diverted flow rate with the flowmeter 120 (Block 356) and having the processing unit 130 calculate main pipe flow rate based on the linear relationship defined by the x-intercept and slope (Block 358). In this way, given the character of the fluid, the processing unit 130 can back-calculate the slope and the x-intercept of the relationship between the side branch's diverted flow rate and the main flow rate for the configuration, can measure the diverted flow rate with the flowmeter, and can then correlate the diverted flow rate to the main flow rate band on the defined relationship.

Figure 7:
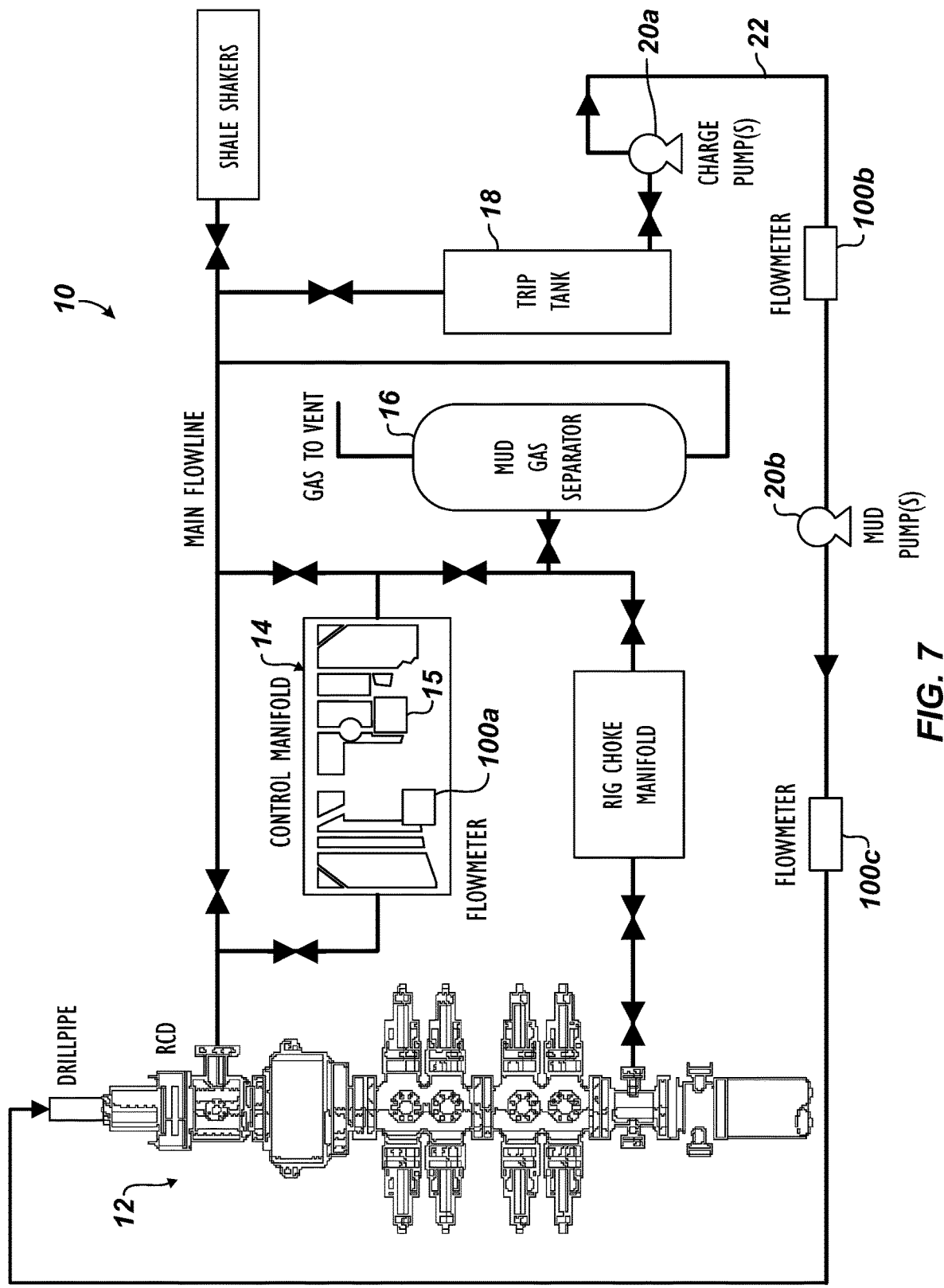
FIG. 7 diagrammatically illustrates a managed pressure drilling system having an apparatus according to the present disclosure for inflow and outflow legs of the system.

The apparatus 100 can be used in a number locations in a drilling system. FIG. 7 diagrammatically illustrates a managed pressure drilling system 10 having more than one apparatus 100a-c according to the present disclosure disposed in the system 10. The apparatus 100a can be disposed upstream of the chokes in the manifold 14. As noted, the drilling fluid from the wellhead 12 may be at high pressure. Rather than needing to be placed after the drilling chokes in the control manifold 14 to reduce the pressure before measuring the flow rate, the disclosed apparatus 100a can be placed in the high pressure flow upstream of the chokes in the manifold 14. This can provide more direct and accurate measurements for controlling the drilling operation.

In addition, one or more apparatus 100b-c can be disposed on the inflow leg 22 of the system 10. In this position, the disclosed apparatus 100b-c can more accurately measure the mass flow rate and density of the inflow of fluid.

In one arrangement, the apparatus 100b can be disposed downstream of a charge pump 20a from the trip tank 18 and uphole of the mud pumps 20b. Fluid pressure from the mud tanks 18 is negligible, and the charge pumps 20a charge the fluid to about 50 to 100-psi before the fluid reaches the mud pumps 20b. In that sense, the apparatus 100b after the charge pumps 20a may or may not need to be particularly rated for high-pressure as disclosed herein. Either way, this apparatus 100b can be used to measure the inflow rate and the fluid density as well as other useful characteristics of the drilling fluid from the mud tanks 18.

In an alternative or additional arrangement, the apparatus 100c can be disposed downstream of the mud pumps 20b feeding into the well. The standpipe pressure of the fluid after the mud pumps 20b can be between 1000 to 7000-psi. In this case, the apparatus 100c is preferably a high-pressure flowmeter according to the present disclosure. This apparatus 100c can be used to measure the mass flow rate for the inflow of the drilling fluid in the well control system.

Measurement of the flow rate at the inlet leg 22 after the mud pumps 20b is conventionally achieved using stroke counters and other convoluted techniques that estimate the flow produced from the pumps 20b. As is known, multiple pumps 20b are typically used and the flow from each is combined. According to prior art techniques, pump strokes are counted for each pump 20b to determine their flow, and the resulting flow estimates are combined to determine the combined flow. Additionally, various considerations of pump efficiency and the like are typically taken into account to more accurately estimate the resulting flow. The prior art techniques for estimating the flow from the pumps 20b can be inaccurate and fraught with errors.

The disclosed apparatus 100c disposed on the inflow leg 22, however, can avoid all of these issues to measure the flow rate at the increased pressure of the combined flow from the mud pumps 20b, which can provide a more accurate flow profile than pump stroke counters. Additionally, the disclosed apparatus 100c can determine the density of the fluid in the system 10, which can have its own benefits in controlling the system 10.

Although discussed in reference to monitoring flow in a managed pressure drilling system, the apparatus 100 of the present disclosure can also be used for other drilling applications besides managed pressure drilling. Moreover, although disclosed in terms of drilling, it will be appreciated that the teachings of the present disclosure and the disclosed apparatus 100 can also be used in any type of process flow where a main flow rate is to be measured at high pressures.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An apparatus for measuring a main flow rate of flow through a flowline, the apparatus comprising:
    a differential pressure device disposed in the flowline and producing a pressure drop in the flow from an upstream side of the differential pressure device to a downstream side of the differential pressure device;
    piping diverting a portion of the flow in the flowline from an inlet on the upstream side of the differential pressure device to an outlet on the downstream side of the pressure device;
    a flowmeter in fluid communication with the piping and measuring a parameter of the diverted portion of the flow;
    a processing unit receiving the measured parameter from the flowmeter, the processing unit determining a diverted flow rate of the diverted portion of the flow from the measured parameter and correlating the determined diverted flow rate to a value of the main flow rate through the flowline; and a control manifold of a drilling system disposed on the flowline downstream of the differential pressure device and receiving the flow of drilling fluid returns from a borehole.

2. The apparatus of claim 1, wherein the differential pressure device is selected from the group consisting of an orifice plate, a V-cone, an orifice plate with a variable orifice, a venturi tube, a flow nozzle, a Dall tube, a venturi cone, a venturi nozzle, and a choke.

3. The apparatus of claim 1, wherein the flowmeter is selected from the group consisting of a volumetric flowmeter, a mass flowmeter, an inertial flowmeter, and a Coriolis flowmeter.

4. The apparatus of claim 1, further comprising a pump of a drilling system disposed on the flowline upstream of the differential pressure device and pumping the flow of drilling fluid from a mud tank to a borehole.

5. The apparatus of claim 1, wherein the flowmeter measures mass flow rate as mass of the fluid traveling past per unit time for the parameter of the diverted portion of the flow.

6. The apparatus of claim 1, wherein to correlate the diverted flow rate to the value of the main flow rate, the processing unit is configured to:
 store, for each of a plurality of fluid types, a relationship of the main flow rate relative to the diverted flow rate;
 obtain the fluid type of the flow; and
 correlate the value of the main flow rate from the relationship relative to the diverted flow rate for the obtained fluid type of the flow.

7. The apparatus of claim 6, wherein the relationship of the main flow rate relative to the diverted flow rate for at least one of the fluid types comprises a linear relationship or a polynomial relationship.

8. The apparatus of claim 1, wherein a relationship of the diverted flow rate relative to the main flow rate through the flowline used in the correlation is a function of a first diameter of the flowline, a second diameter of the piping, a first character of the differential pressure device, and a second character of the fluid of the flow.

9. The apparatus of claim 8, wherein the first character of the differential pressure device at least includes a beta-ratio of the differential pressure device; and wherein the second character of the fluid of the flow at least includes a consistency index and a power-law index of a Herschel-Bulkely model.

10. The apparatus of claim 1, wherein to correlate the diverted flow rate to the value of the main flow rate, the processing unit is configured to:
 obtain a character of the fluid of the flow;
 determine, based on the obtained character, an intercept in a relationship between the main flow rate and the diverted flow rate at which the diverted flow rate is zero;
 determine, based on the obtained character, a slope in the relationship between the main flow rate and the diverted flow rate; and
 correlate the value of the main flow rate relative to the diverted flow rate from the intercept and the slope in the relationship.

11. The apparatus of claim 10, wherein the character of the fluid of the flow at least includes a consistency index and a power-law index of a Herschel-Bulkely model for the fluid.

12. A drilling system for drilling a borehole with drilling fluid, the system comprising:

a flow loop communicating the drilling fluid from the borehole to at least one drilling choke, communicating the drilling fluid from at least one tank to at least one pump, and communicating the drilling fluid from the at least one pump to the borehole;
a differential pressure device disposed in the flow loop at a measurement location and producing a pressure drop in flow of the drilling fluid from an upstream side of the differential pressure device to a downstream side of the differential pressure device;
piping diverting a portion of the flow in the flow loop at the measurement location from an inlet on the upstream side of the pressure device to an outlet on the downstream side of the pressure device;
a flowmeter in fluid communication with the piping and measuring a parameter of the diverted portion of the flow; and
a processing unit receiving the measured parameter from the flowmeter, the processing unit determining a diverted flow rate of the diverted portion of the flow from the measured parameter and correlating the determined diverted flow rate to a value of the main flow rate through the flow loop at the measurement location.

13. The system of claim 12, wherein the measurement location is disposed in the flow loop between the borehole and the at least one drilling choke.

14. The system of claim 12, wherein the measurement location is disposed in the flow loop between the at least one pump and the borehole.

15. A method of measuring a main flow rate of flow through a flowline, the method comprising:
 producing, using a differential pressure device disposed in the flowline, a pressure drop in the flow from an upstream side of the differential pressure device to a downstream side of the differential pressure device;
 diverting, using piping on the flowline, a portion of the flow in the flowline from an inlet on the upstream side of the differential pressure device to an outlet on the downstream side of the differential pressure device;
 measuring, using a flowmeter in fluid communication with the piping, a parameter of the diverted portion of the flow;
 determining, using a processing device receiving the measured parameter, a diverted flow rate of the diverted portion of the flow from the measured parameter; and
 correlating, using the processing device, the determined diverted flow rate to a value of the main flow rate through the flowline based on a relationship of the diverted flow rate relative to the main flow rate, the relationship being a function of a first diameter of the flowline, a second diameter of the piping, a first character of the differential pressure device, and a second character of the fluid of the flow,
 wherein the first character of the differential pressure device at least includes a beta-ratio of the differential pressure device, and
 wherein the second character of the fluid of the flow at least includes a consistency index and a power-law index of a Herschel-Bulkely model.

16. The method of claim 15, further comprising:
 measuring drilling fluid flow through the flowline of a drilling system used in drilling a borehole between one of: the borehole and at least one drilling choke, at least one tank and at least one pump, and the at least one pump and the borehole; and
 determining the main flow rate of the drilling fluid flow through the flowline using the correlation.

17. The method of claim 15, wherein correlating the determined diverted flow rate to the value of the main flow rate through the flowline comprises:
- storing, for each of a plurality of fluid types, a relationship of the main flow rate relative to the diverted flow rate;
- obtaining the fluid type of the flow; and
- correlating the value of the main flow rate from the relationship relative to the diverted flow rate for the obtained fluid type of the flow.

18. The method of claim 15, wherein correlating the determined diverted flow rate to the value of the main flow rate through the flowline comprises:
- determining, based on the second character of the fluid of the flow, an intercept in the relationship between the main flow rate and the diverted flow rate at which the diverted flow rate is zero;
- determining, based on the second character, a slope in the relationship between the main flow rate and the diverted flow rate; and
- correlating the value of the main flow rate relative to the diverted flow rate from the intercept and the slope in the relationship.

19. An apparatus for measuring a main flow rate of flow through a flowline, the apparatus comprising:
- a differential pressure device disposed in the flowline and producing a pressure drop in the flow from an upstream side of the differential pressure device to a downstream side of the differential pressure device;
- piping diverting a portion of the flow in the flowline from an inlet on the upstream side of the differential pressure device to an outlet on the downstream side of the pressure device;
- a flowmeter in fluid communication with the piping and measuring a parameter of the diverted portion of the flow;
- a processing unit receiving the measured parameter from the flowmeter, the processing unit determining a diverted flow rate of the diverted portion of the flow from the measured parameter and correlating the determined diverted flow rate to a value of the main flow rate through the flowline; and
- a pump of a drilling system disposed on the flowline upstream of the differential pressure device and pumping the flow of drilling fluid from a mud tank to a borehole.

20. The apparatus of claim 19, wherein the differential pressure device is selected from the group consisting of an orifice plate, a V-cone, an orifice plate with a variable orifice, a venturi tube, a flow nozzle, a Dall tube, a venturi cone, a venturi nozzle, and a choke; and wherein the flowmeter is selected from the group consisting of a volumetric flowmeter, a mass flowmeter, an inertial flowmeter, and a Coriolis flowmeter.

21. The apparatus of claim 19, wherein to correlate the diverted flow rate to the value of the main flow rate, the processing unit is configured to:
- store, for each of a plurality of fluid types, a relationship of the main flow rate relative to the diverted flow rate;
- obtain the fluid type of the flow; and
- correlate the value of the main flow rate from the relationship relative to the diverted flow rate for the obtained fluid type of the flow.

22. The apparatus of claim 19, wherein a relationship of the diverted flow rate relative to the main flow rate through the flowline used in the correlation is a function of a first diameter of the flowline, a second diameter of the piping, a first character of the differential pressure device, and a second character of the fluid of the flow.

23. The apparatus of claim 22, wherein the first character of the differential pressure device at least includes a beta-ratio of the differential pressure device; and wherein the second character of the fluid of the flow at least includes a consistency index and a power-law index of a Herschel-Bulkely model.

24. The apparatus of claim 19, wherein to correlate the diverted flow rate to the value of the main flow rate, the processing unit is configured to:
- obtain a character of the fluid of the flow;
- determine, based on the obtained character, an intercept in a relationship between the main flow rate and the diverted flow rate at which the diverted flow rate is zero;
- determine, based on the obtained character, a slope in the relationship between the main flow rate and the diverted flow rate; and
- correlate the value of the main flow rate relative to the diverted flow rate from the intercept and the slope in the relationship.

25. The apparatus of claim 24, wherein the character of the fluid of the flow at least includes a consistency index and a power-law index of a Herschel-Bulkely model for the fluid.

* * * * *